A. BELLEFEUILLE.
SPRING BED.
APPLICATION FILED AUG. 7, 1911.
1,027,170.
Patented May 21, 1912.
2 SHEETS—SHEET 1.
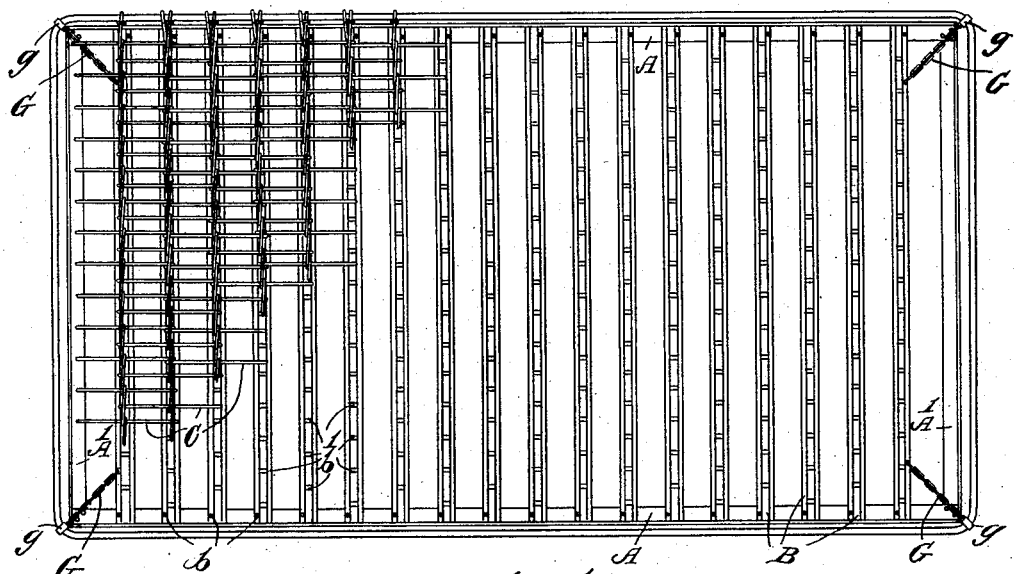
Fig. 1.
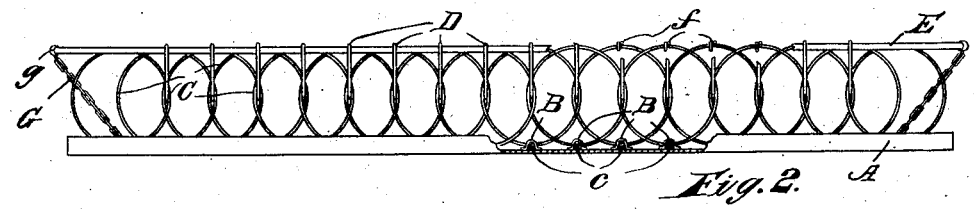
Fig. 2.
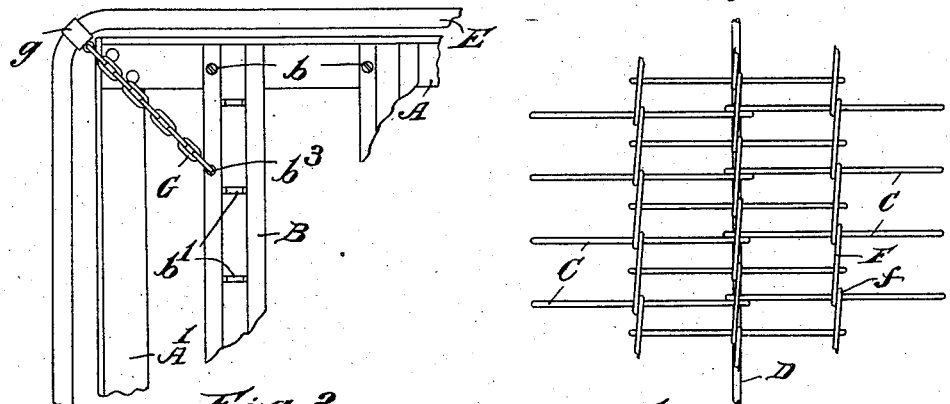
Fig. 3.
Fig. 4.
WITNESSES:
Sudger A. Nicol.
Harold F. Dodge.
INVENTOR:
Antoni Bellefeuille,
BY
Albert M. Moore,
His ATTORNEY.

A. BELLEFEUILLE.
SPRING BED.
APPLICATION FILED AUG. 7, 1911.

1,027,170.

Patented May 21, 1912.

2 SHEETS—SHEET 2.

WITNESSES:
Ludger A. Nicol.
Harold F. Dodge.

INVENTOR:
Antoni Bellefeuille,
BY Albert M. Moore,
His ATTORNEY.

COLUMBIA PLANOGRAPH CO., WASHINGTON, D. C.

UNITED STATES PATENT OFFICE.

ANTONI BELLEFEUILLE, OF LOWELL, MASSACHUSETTS.

SPRING-BED.

1,027,170.  Specification of Letters Patent.  Patented May 21, 1912.

Application filed August 7, 1911. Serial No. 642,772.

*To all whom it may concern:*

Be it known that I, ANTONI BELLEFEUILLE, a citizen of the United States, residing at Lowell, in the county of Middlesex and Commonwealth of Massachusetts, have invented a new and useful Improvement in Spring-Beds, of which the following is a specification.

This invention relates to spring beds and is adapted also to similar constructions adapted to afford a yielding support to the weight of the body of a person resting thereon as a seat or couch.

The object of this invention is to furnish a spring bed bottom comprising elastic rings, suitable supports therefor, a frame and connections between the rings and means for securing the rings as a whole in place in such a manner as to cause the rings to coact with each other to furnish a nearly continuous surface of substantially uniform resiliency.

Figure 5:
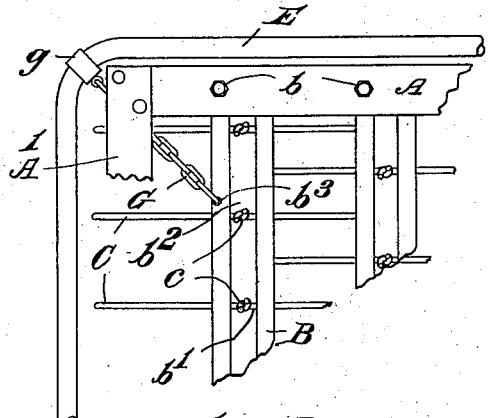
Figure 7:
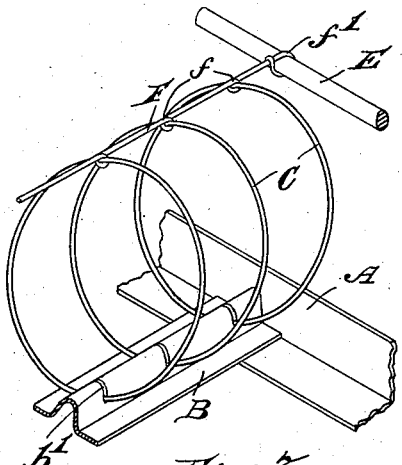
Figure 6:
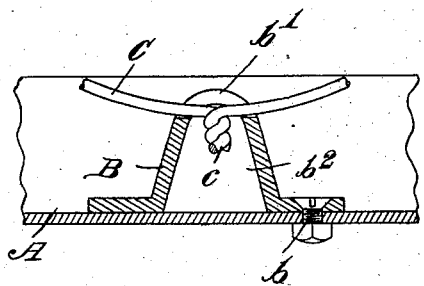
Figure 8:
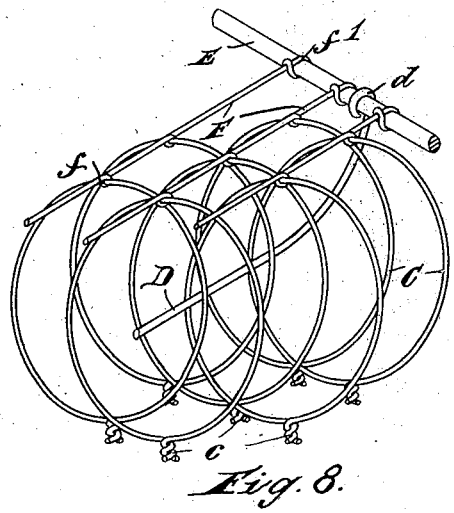

In the accompanying drawing on two sheets, Figure 1 is a plan of the spring bed bottom, the rings and their connections being omitted, except at the upper left portion of said figure, to show the construction of the supporting parts; Fig. 2, a side elevation of the same; Fig. 3, an enlarged plan of a part of the stretcher, part of the frame or inelastic portions of the bed and a flexible connection; Fig. 4, an enlarged plan of a part of the wire portion of the bed bottom; Fig. 5, a reversed plan of a part of the stretcher, part of the frame, a flexible connection and some rings showing the means for securing the rings to their supporting channel-irons; Fig. 6, a vertical section of one of the channel-irons and its supporting angle-irons through one of the slots which receives the rings with part of a ring; Fig. 7, an isometric perspective view of a part of an angle-iron, part of a channel-iron, part of the stretcher, some elastic rings and the means for connecting said rings to each other and to said stretcher; Fig. 8, an isometric perspective view of some elastic rings and a part of the stretcher, the spacing wires and an alining wire.

The bed-bottom frame comprises side-rails consisting of angle-irons A A which rest upon rails or ledges of the bedstead (not shown) in any usual manner. Other angle-irons $A^1$ $A^1$ or end-rails may be secured as by rivets to the irons A A to form with them a rectangular skeleton. Upon the horizontal parts of two opposite parallel angle-irons are secured, as by rivets or bolts $b$, spring-supporting rails represented as inverted channel-irons B provided with transverse slits $b^1$ to receive the elastic wire rings or annular springs C. These slits $b^1$ are vertical and are each just wide enough to admit the ends of the wire, which ends are joined to form a ring C by twisting at $c$ within the channel $b^2$ of the corresponding channel-iron (Figs. 5, 6, 7, 8), the twist $c$ or enlargement of the ring within the channel retaining the ring in its slit. The slits $b^1$ in the adjacent rails or channel-irons alternate with each other, as shown in Fig. 1, to allow the rings C on each rail or channel-iron to extend beyond, in each direction, the adjacent sides of the rings on the second channel-irons therefrom (Figs. 1, 2, 4, 5, 8), except near the ends or sides of the bed-bottom which are parallel with said channel-irons. Through these overlapping parts of the rings C is stretched an alining-wire D parallel with and above the channel-iron intermediate the channel-irons which support these overlapping rings, the ends of said alining wire D being secured, as by looping $d$ to the stretcher E which for lightness is preferably formed of steel tubing bent into a rectangle but may be of stout wire. All the rings C supported on the same rail or channel-iron are connected by a spacing-wire F which is looped at $f$ about each of said rings and at its ends is secured to the stretcher E by looping at $f^1$ about said stretcher. The stretcher is sufficiently supported by the numerous alining wires D and spacing wires F and causes all the rings to maintain their proper relative position. Said stretcher is secured at its corners to the adjacent channel-irons by flexible connections represented as chains G and clasps $g$ which surround said stretcher, the inner end of each chain being hooked through a hole $b^3$ in the adjacent channel-iron.

I claim as my invention:—

1. The combination, in a spring bottom, of two parallel side-rails, inverted channel-irons arranged parallel with each other and rigidly secured to said side-rails at right angles therewith, said channel-irons having transverse slits, and rings, each consisting of a spring wire having its end-portions arranged in one of said slits and twisted together within the corresponding channel.

2. The combination, in a spring bottom, of two parallel side-rails, inverted channel-irons arranged parallel with each other and rigidly secured to said side-rails at right angles therewith, said channel-irons having transverse slits, rings, each consisting of a spring wire having its end-portions arranged in one of said slits and twisted together within the corresponding channel, a continuous stretcher, spacing wires, each connecting all of the rings supported by the same channel-iron and having its ends secured to said stretcher at opposite sides of said bottom, and flexible connections between said stretcher and adjacent channel-irons.

3. The combination, in a spring bottom, of two parallel side-rails, inverted channel-irons arranged parallel with each other and rigidly secured to said side-rails at right angles therewith, said channel-irons having transverse slits, elastic rings or annular springs, each secured in one of said slits and the rings on one channel-iron overlapping the rings on one or more other channel-irons, a continuous stretcher arranged outside of all said rings, an alining wire, parallel with said channel-irons extending through the overlapping parts of all said rings and having its ends secured to said stretcher at opposite sides of said bottom and flexible connections between said stretcher and adjacent channel-irons.

4. The combination in a spring bottom, of two parallel side-rails, inverted channel-irons arranged parallel with each other and rigidly secured to said side-rails at right angles therewith, said channel-irons having transverse slits, rings, each consisting of a spring wire having its end portions arranged in one of said slits and twisted together within the corresponding channel, the rings on one channel-iron overlapping the rings on one or more other channel-irons, a continuous stretcher arranged outside of all said rings, an alining wire, parallel with said channel-irons extending through the overlapping parts of all said rings and having its ends secured to said stretcher at opposite sides of said bottom and flexible connections between said stretcher and adjacent channel-irons.

In witness whereof, I have affixed my signature in presence of two witnesses.

ANTONI BELLEFEUILLE.

Witnesses:
ALBERT M. MOORE,
JEAN B. BERNIER.

---

Copies of this patent may be obtained for five cents each, by addressing the "Commissioner of Patents, Washington, D. C."